United States Patent [19]

Yamada et al.

[11] 4,222,992

[45] Sep. 16, 1980

[54] PROCESS FOR THE REMOVAL OF SULFUR OXIDES FROM EXHAUST GASES USING SLURRY OF RED MUD CONTAINING CALCIUM ION

[75] Inventors: Koichi Yamada; Takuo Harato; Yasumi Shiozaki, all of Niihama, Japan

[73] Assignee: Sumitomo Aluminium Smelting Company, Limited, Osaka, Japan

[21] Appl. No.: 15,756

[22] Filed: Feb. 27, 1979

[30] Foreign Application Priority Data

Feb. 27, 1978 [JP] Japan .................................. 53-22398

[51] Int. Cl.$^2$ .............................................. C01B 17/00
[52] U.S. Cl. .................................................. 423/242
[58] Field of Search .......... 423/242 A, 242 R, 244 A, 423/244 R

[56] References Cited

U.S. PATENT DOCUMENTS

| 3,298,781 | 1/1967 | Fukuma et al. ....................... 423/184 |
| 3,551,093 | 12/1970 | Myers et al. ....................... 423/244 A |
| 3,944,649 | 3/1976 | Field ................................. 423/242 A |
| 3,980,756 | 9/1976 | Dixson et al. ................... 423/242 A |

*Primary Examiner*—O. R. Vertiz
*Assistant Examiner*—Gregory A. Heller
*Attorney, Agent, or Firm*—Birch, Stewart, Kolasch & Birch

[57] ABSTRACT

A process for the removal of sulfur oxides from exhaust gases by absorbing with a slurry of red mud containing calcium ion which comprises the steps of:

(1) contacting an exhaust gas containing sulfur oxides of not higher than about 100° C. with a slurry of red mud containing calcium ion led from the next step (2) to take up sulfur oxides in the gas until pH of the slurry becomes in the range of 4.3 to less than 6 while maintaining the molar fraction of $SO_4^{--}$ to total $SO_2$ in the slurry within the said pH range at 0.05 to 0.7; and then, (2) contacting the treated gas with a fresh slurry of red mud containing calcium ion to further take up sulfur oxides in the gas while maintaining the concentration of $NaHSO_3$ in the slurry at not more than about 8 g/l.

13 Claims, 1 Drawing Figure

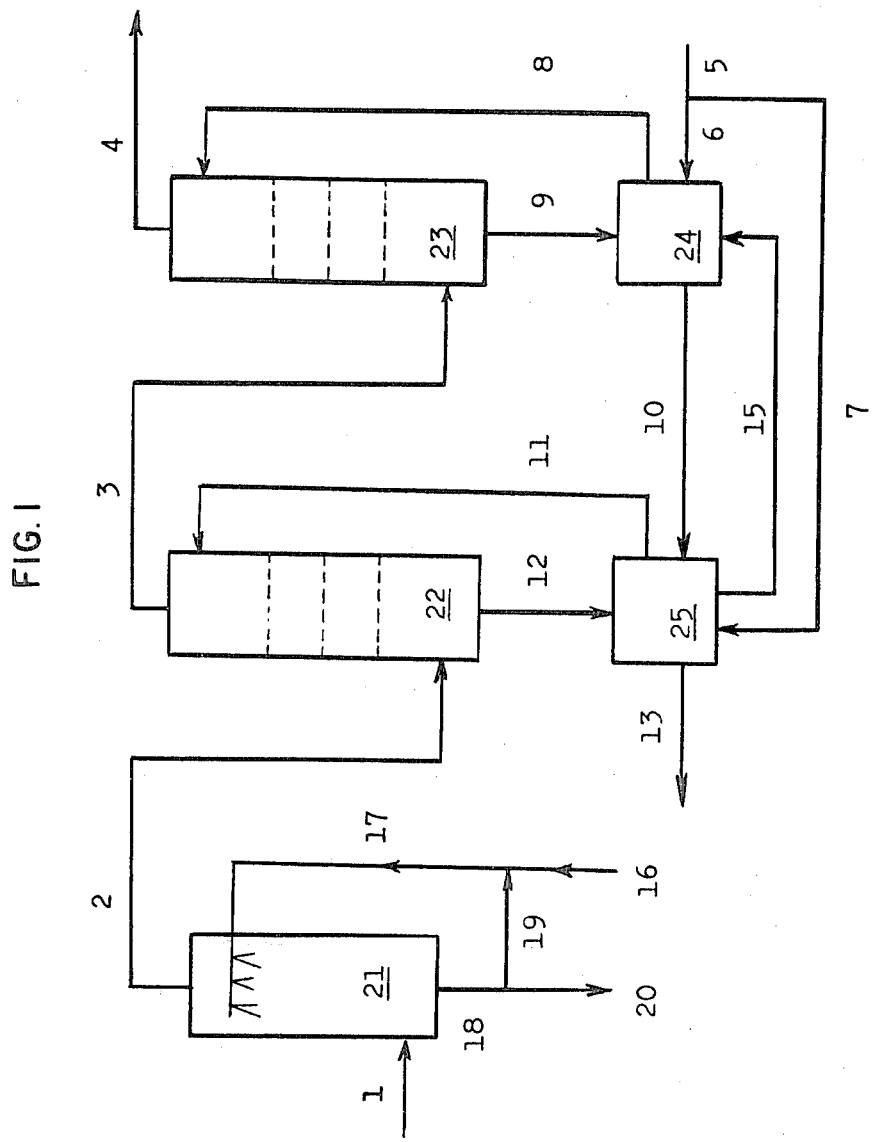

PROCESS FOR THE REMOVAL OF SULFUR OXIDES FROM EXHAUST GASES USING SLURRY OF RED MUD CONTAINING CALCIUM ION

The present invention relates to a process for the removal of sulfur oxides from exhaust gases by absorbing with a slurry of red mud containing calcium ion. More particularly, it relates to a process for the removal of sulfur oxides from exhaust gases which comprises treating the exhaust gases with red mud containing calcium ion, which is an undissolved residual by-product in the production of alumina, at an improved absorption efficiency of sulfur oxides and an improved leaching yield of soda from red mud with preventing scale formation on an equipment employed.

Recently, air pollution due to exhaust gases becomes a serious social problem. Exhaust gases such as those from a boiler, a combustion furnace and the like are generally composed of 0.05 to 5% by volume of $SO_2$, 2 to 5% by volume of $O_2$, 10 to 20% by volume of $CO_2$, 70 to 80% by volume of $N_2$ and 0.0005 to 0.005% by volume of $SO_3$, and $SO_2$ in the exhaust gases is one of causative materials of air pollution. However, the removal of this harmful $SO_2$ from exhaust gases requires a large amount of investment and a great running expense, and satisfactory method for the removal of $SO_2$ has not yet been found.

On the other hand, red mud is known as an undissolved residual by-product in Bayer process which is a principal process for the production of alumina. Red mud is generally composed of 8 to 10% by weight of $Na_2O$, 18 to 22% by weight of $Al_2O_3$, 17 to 22% by weight of $SiO_2$, 30 to 37% by weight of $Fe_2O_3$, 2 to 5% by weight of $TiO_2$ and 8 to 12% by weight of ignition loss and contains available materials such as soda (sodium compounds), alumina, silica and the like. However, these materials have been discarded without recovery.

Besides, calcium content of red mud varies with a particular process employed. In Bayer process, various treatments are optionally accompanied, for example, causticization of Bayer liquor with lime in order to convert another by-product, sodium carbonate, into sodium hydroxide, and addition of lime to Bayer liquor in order to remove impurities such as phosphorus, vanadium and the like and also to improve the yield of $Al_2O_3$. In some cases, the red mud thus obtained contains substantially no calcium even if the above treatment are carried out, and in other cases, the red mud contains more than about 1.5% by weight of calcium (as CaO) based on the solid material thereof. Thus, the calcium content of red mud depends upon the particular process employed.

In the present invention, a slurry of red mud containing more than about 0.1% by weight of calcium (as CaO) is used. The term "slurry of red mud containing calcium ion" used in the specification and the claims means a slurry of red mud which contains more than about 0.1% by weight of calcium (as CaO) and, sometimes, it is merely referred to as "red mud".

It has already been known to utilize red mud which was discarded in the removal of sulfur oxides from exhaust gases so as to take up $SO_2$ in the gases with soda leached out from red mud.

For example, in U.S. Pat. No. 3,298,781, there is disclosed a process for removing sulfur oxides from exhaust gases which comprises cooling an exhaust gas containing sulfur oxides exhausted from a combustion equipment to a temperature of from room temperature to 100° C., contacting the gas with a slurry of red mud and reacting sulfur oxides in the gas with soda contained in the red mud until the pH becomes 4 to 5, and thereby, sulfur oxides being mainly taken up in the form of acid sodium sulfite. However, when the above process is carried out in an industrial scale, it is difficult to attain more than 80% of the absorption efficiency of sulfur oxides in an exhaust gas since sulfur oxides is mainly taken up as acid sodium sulfite and partial pressure of acid sodium sulfite in the absorption system rises. Moreover, the leaching yield of soda from red mud is less than about 50% and the process is insufficient in view of the absorption efficiency of sulfur oxides and utilization of soda in red mud.

In Japanese Patent Publication (not examined) No. 44773/1977, there is disclosed a process for removing sulfur oxides from exhaust gases which comprises cooling an exhaust gas containing sulfur oxides to not more than 100° C. and contacting the cooled gas with a slurry of red mud while maintaining the pH at not less than 6. However, this process is also insufficient since the utilization efficiency of soda in red mud is low due to pH value of not less than 6.

Further, in Japanese Patent Publication No. 40870/1976, there is disclosed a process for removing sulfur oxides from exhaust gases wherein a slurry of red mud is oxidized after absorption of sulfur oxides and then reused in the system so as to improve the leaching yield of soda from red mud as well as the removal efficiency of sulfur oxides from exhaust gases. This process is excellent in view of the improved leaching yield of soda from red mud and the improved removal efficiency of $SO_2$. However, it has been found that a running time of the absorption system is remarkably reduced due to scale formation of calcium compounds in an absorption tower if the above process is carried out with a slurry of red mud containing calcium ion, whereas there is no trouble if the above process is carried out with a slurry of red mud containing no calcium ion. That is, in case of using a slurry of red mud containing calcium ion, the above process is ineffective.

Under these circumstances, we have intensively studied to establish a process for the removal of sulfur oxides from exhaust gases using a slurry of red mud containing calcium ion which can be carried out at an improved absorption efficiency of sulfur oxides and an improved leaching yield of soda from red mud with preventing scale formation and have found that scale formation has relation to pH of a slurry of red mud to be used and the molar fraction of $SO_4^{--}$ to total $SO_2$ in the slurry.

An object of the present invention is to provide a process for the removal of sulfur oxides from exhaust gases by absorbing with a slurry of red mud containing calcium ion.

Another object of the present invention is to provide a method for preventing scale formation in a process for the absorption removal of sulfur oxides from exhaust gases using a slurry of red mud containing calcium ion.

Still another object of the present invention is to provide a method for improving the absorption efficiency of sulfur oxides and the leaching yield of soda from red mud in a process for the absorption removal of sulfur oxides from exhaust gases using a slurry of red mud.

These and other objects of the present invention will be apparent from the following description.

In accordance with the present invention, these and other objects are generally accomplished by providing a process for the removal of sulfur oxides from exhaust gases by absorbing with a slurry of red mud containing calcium ion which comprises the steps of:

(1) contacting an exhaust gas containing sulfur oxides of not higher than about 100° C. with a slurry of red mud containing calcium ion which is circulated from the next step (2) to take up sulfur oxides in the gas until the pH of the slurry becomes in the range of 4.3 to less than 6 while maintaining the molar fraction of $SO_4^{--}$ to total $SO_2$ in the slurry within the above pH range at 0.05 to 0.7; and (2) contacting the treated gas with a fresh slurry of red mud containing calcium ion to further take up sulfur oxides in the gas while maintaining the concentration of $NaHSO_3$ in the slurry at not more than about 8 g/l.

In order to practice the present invention, when the exhaust gas to be treated has a temperature of not higher than about 100° C., the gas is directly subjected to the treatment of the present invention. When the exhaust gas to be treated has a temperature of higher than 100° C., like an exhaust gas from a boiler, a combustion furnace or a refinery, the gas is cooled to not higher than about 100° C., preferably 40° to 80° C., with a cooling fluid such as water, sea water and the like, and then subjected to the treatment of the present invention. For cooling an exhaust gas, a spray tower, a plate type absorption tower, a wetted-wall tower, a perforated plate tower, a wooden grid packed tower, a bubbling tower and the like can be used. Although the feed ratio of an exhaust gas and a cooling liquid, i.e. liquid-gas ratio ($l/Nm^3$), varies with the particular cooling step to be employed, the ratio of more than 0.3 is generally sufficient.

According to the present invention, a sulfur oxides-containing exhaust gas having a temperature of not higher than about 100° C. is subjected to the first step treatment of the present invention wherein the gas is brought into contact with a slurry of red mud containing calcium ion, which has already been used in the following second step treatment and has partially absorbed sulfur oxides, to take up sulfur oxides in the gas until the pH of the slurry reaches to the range of 4.3 to less than 6 while the molar fraction of $SO_4^{--}$ to total $SO_2$ in the slurry within the above pH range is maintained at 0.05 to 0.7.

In the first step, sulfur oxides are taken up by a slurry of red mud at the pH of the slurry ranging from 4.3 to less than 6, preferably, from 5 to less than 6.

When sulfur oxides to be taken up are small in quantity and the pH of a slurry of red mud is over 6, it is not economical since the absorption of sulfur oxides per the amount of the slurry is lowered. To the contrary, when sulfur oxides to be taken up are large in quantity and pH of a slurry of red mud is less than 4.3, the absorption efficiency is lowered and materials in the red mud other than soda, for example, alumina, silica and the like are leached out and separated out in the next step which causes complication in the operation.

On the other hand, it has been found that when the absorption of sulfur oxides is carried out at the above pH range, scale is built up in an absorption tower within a short period of time and the operation of the system becomes difficult. It was experimentally confirmed that the main component of the scale is $CaSO_4$ and that the $CaSO_4$ scale causes by the lowering of the solubility of $CaSO_4$ which depends upon both the molar fraction of $SO_4^{--}$ to total $SO_2$ in the slurry and the pH of the slurry. That is, when the molar fraction of $SO_4^{--}$ to total $SO_2$ in the slurry of red mud is over 0.7 at a pH value of less than 6, the solubility of $CaSO_4$ is decreased with lowering of the pH value and $CaSO_4$ scale is built up.

Although the reason why the oxidizing rate of $NaHSO_3$ (formation of $SO_4^{--}$) in a slurry of red mud varies with pH is not clear, it has been found that $NaHSO_3$ is quickly oxidized at a pH of less than 6 whereas $NaHSO_3$ is slowly oxidized at a pH of 6 or more. Thus, the molar fraction usually becomes more than 0.7 in a conventional industrial process which is usually carried out at a pH of less than 6. This fact is also described, for example, in MITSUBISHI JUKO GIHO, Vol. 2, No. 5, Page 572, wherein it is described as follows: "When sulfur oxides are taken up until pH 4.6 to 4.7, 70 to 90% of soda in the liquid is converted into $Na_2SO_4$ due to oxidation by oxygen in the gas." Thereby $CaSO_4$ scale is built up.

To the contrary, when the molar fraction of $SO_4^{--}$ to total $SO_2$ in a slurry of red mud is not more than 0.7, the solubility of $CaSO_4$ is increased with lowering of the pH value. Therefore, the molar fraction of $SO_4^{--}$ to $SO_2$ in a slurry of red mud should be maintained at 0.7 or less.

When the molar fraction of $SO_4^{--}$ to total $SO_2$ in a slurry of red mud is less than 0.05 at a pH of less than 6, it is not preferable since the partial pressure of $NaHSO_3$ rises and the absorption efficiency is lowered and, moreover, $CaSO_3$ scale is also built up.

Therefore, in the first step, absorption of sulfur oxides is carried out by maintaining the molar fraction of $SO_4^{--}$ to total $SO_2$ in a slurry of red mud at 0.05 to 0.7, preferably, 0.12 to 0.6. The molar fraction can be maintained in the suitable range by controlling a residence time of a slurry of red mud in a circulating tank where the slurry is held and repeatedly circulated between an absorption tower and the tank, and further the manner of absorption, the concentration of oxygen in an exhaust gas to be treated and the like. The concentration of oxygen in the gas can be controlled by regulating the rate of excess air in a boiler, a combustion furnace and the like.

Although the feed ratio of a slurry of red mud containing calcium ion and an exhaust gas containing sulfur oxides, i.e. liquid-gas ratio ($l/Nm^3$), in the first step varies with the manner of contacting them, the ratio is generally more than 0.3, preferably 1 to 3.

For absorption, a turbo-grid tower, a plate type absorption tower such as Kittel tray, a TCA tower, a wetted-wall tower, a wooden grid packed tower, a perforated plate tower, a non-dike perforated plate tower and the like can be used.

The exhaust gas thus treated in the first step is subjected to the second step treatment of the present invention wherein the remaining sulfur oxides are further taken up with a fresh slurry of red mud until the concentration of sulfur oxides in the gas reaches a predetermined level, usually less than 100 ppm. On the other hand, the slurry of red mud used in the first step is taken out of the absorption system. Preferably, the slurry thus taken out is discarded after mixing with a cooling water led from the above cooling step.

In the second step, the gas treated in the first step is further brought into contact with a fresh slurry of red mud containing calcium ion to take up the remaining sulfur oxides in the gas while the concentration of $NaHSO_3$ in the slurry is maintained at not more than about 8 g/l, preferably not more than about 4 g/l.

The concentration of $NaHSO_3$ in a slurry of red mud containing calcium ion may practically be controlled within the range of about 0 to 30 g/l by means of regulating a liquid-gas ratio in an absorption zone, a residence time of a slurry, a concentration of oxygen in an exhaust gas and the like. However, in the present invention, the concentration of $NaHSO_3$ should be maintained at the above level, since the absorption efficiency of $SO_2$ is remarkably lowered due to high partial pressure of $NaHSO_3$, if the concentration of $NaHSO_3$ becomes higher than the above level.

For maintaining the concentration of $NaHSO_3$ in a slurry of red mud at about 8 g/l or lower, there can be employed processes as disclosed in Japanese Patent Publication No. 40870/1976. For example, a slurry of red mud to be used in the second step is led to a circulating tank and therein acid sodium sulfite contained in the slurry is oxidized by blowing an oxidizing agent such as air, oxygen or the like. Alternatively, the slurry of red mud may be oxidized only with oxygen in the gas by holding the slurry in an absorption tower for a long time (by circulating the slurry many times) or holding the slurry in a circulating tank for a long time, usually, more than about 0.2 hour, preferably 1 to 3 hours. The latter processes are preferable since any specific power is not needed.

The above oxidization treatment improves not only the absorption efficiency of sulfur oxides in an exhaust gas but also the utilization efficiency or leaching yield of soda in a slurry of red mud.

Although the feed ratio of a slurry of red mud containing calcium ion and an exhaust gas from the above first step, that is, the liquid-gas ratio (l/Nm$^3$) in the second step, also varies with the particular process to be employed, the ratio is generally more than 0.3, preferably 1 to 3.

For absorption in the second step, a turbogrid tower, a plate type absorption tower such as Kittel tray, a TCA tower, a wetted-wall tower, a wooden grid packed tower, a perforated plate tower, a non-dike perforated plate tower and the like can be used.

The second step is generally carried out by maintaining the slurry of red mud at a pH of 6 to 9, preferably 7 to 9.

The slurry of red mud used for absorption of sulfur oxides in the present invention contains solid materials in a solid concentration of not more than about 500 g/l, preferably, about 50 to 350 g/l. When the concentration of solid materials exceeds 500 g/l, it is difficult to handle the slurry. On the contrary, the solid concentration is less than 50 g/l, it is not preferable since a huge circulating tank is needed.

Number of absorption stages and absorption towers employed in the first and second steps may be single or plural.

The present invention is further illustrated in detail with reference to the accompanying drawing.

FIG. 1 is a schematic flow of an embodiment of the present invention.

The system shown in FIG. 1 is composed of a cooling tower 21, $SO_2$ absorption towers 22 and 23 and circulating tanks 24 and 25.

An exhaust gas containing sulfur oxides of a high temperature is led to the cooling tower 21 through a pipe 1 and cooled to not more than about 100° C., preferably not more than 80° C., by a cooling fluid such as water, sea water or the like which is led to the tower 21 through pipes 16 and 17. The cooling fluid used for cooling the gas can be partially recycled through a pipe 19, if necessary, and the rest is taken out of the system through pipes 18 and 20. When the temperature of the gas to be treated is not more than about 100° C., this cooling step may be omitted.

The cooled exhaust gas is led to the $SO_2$ absorption tower 22, where the first step treatment of the present invention is carried out, through a pipe 2 and brought into contact with a slurry of red mud at a pH of 4.3 to less than 6, so that sulfur oxides in the gas are taken up in the form of acid sodium sulfite, sodium sulfite and sodium sulfate.

As the $SO_2$ absorption tower 22, for example, a non-dike perforated plate tower, a fluid bed type absorption tower or the like can be used. It is preferable to use such equipment that can attain an intimate contact of the gas and the slurry. The slurry of red mud in the $SO_2$ absorption tower 22 is generally maintained at a temperature of 40° to 80° C.

The slurry of red mud to be used in the first step is fed to the circulating tank 25 through a pipe 10 and, if necessary, through a pipe 7. The slurry in the tank 25 is sent to the $SO_2$ absorption tower 22 through a pipe 11 and then the $SO_2$-absorbed slurry is taken out of the tower and returned to the circulating tank 25 through pipe 12. Thus, in the first step, the slurry is repeatedly circulated through the tank 25, the pipe 11, the tower 22 and the pipe 12. The average residence time of the slurry in the first step is usually more than 0.2 hour, preferably 1 to 3 hours. The molar fraction of $SO_4^{--}$ to total $SO_2$ in the slurry is maintained at 0.05 to 0.7 during the circulation of the slurry. The circulating tank 25 is usually maintained at 40° to 80° C. under around atmospheric pressure. The slurry of red mud fed to the absorption tower 22 through the pipe 11 should be adjusted at a pH range of 4.3 to less than 6. The pH adjustment is preferably carried out by controlling the amount of $SO_2$ taken up in the tower 22 by selection of appropriate absorption tower equipment or regulation of the operation conditions, or by using a slurry having different pH ranges which is fed or discharged through pipes 15 and/or 7, since any specific agent is not needed.

When the desired leaching yield of soda from red mud is attained, the slurry of red mud is taken out of the system through a pipe 13.

After $SO_2$ is partially taken up in the absorption tower 22, the exhaust gas is led to an $SO_2$ absorption tower 23, where the second step treatment of the present invention is carried out, through a pipe 3 and brought into contact with a fresh slurry of red mud of pH 6 to 9, so that the remaining sulfur oxides in the gas are taken up in the form of acid sodium sulfite, sodium sulfite and sodium sulfate. The $SO_2$ absorption tower 23 can be the same as the tower 22 and the similar inner temperature can be employed.

The fresh slurry of red mud to be used in the second step is fed to a circulating tank 24 through pipe 5 and 6. The slurry in the tank 24 is sent to the $SO_2$ absorption tower 23 through pipe 8 and, then, the slurry which has absorbed $SO_2$ in the gas in the tower 23 is taken out of the tower and returned to the circulating tank 24 through a pipe 9. Thus, likewise in the first step, the slurry is repeatedly circulated through the tank 24, the pipe 8, the tower 23 and the pipe 9. The residence time of the slurry in the second step is usually more than 0.2 hour, preferably, 1 to 3 hours. $SO_2$ in the exhaust gas is taken up with the slurry of red mud to form acid sodium sulfite and acid sodium sulfite thus formed is further reacted with soda in red mud to form sodium sulfite and sodium sulfate during the circulation of the slurry, thereby the absorption efficiency of $SO_2$ can be improved.

In this system, $SO_2$ in the gas should be previously taken up in the first step so as to maintain the pH range of the slurry of red mud fed to the absorption tower 23 through the pipe 8 within 6 to 9 even if almost the remaining $SO_2$ in the gas is taken up in the tower 23. Preferably, the type of the tower 23 and the operation conditions thereof should be selected so that almost the remaining $SO_2$ in the gas is removed in the second step. The slurry used in the second step is sent to the circulating tank 25 through the pipe 10 and reused in the first step.

The exhaust gas thus treated is released to atmosphere through a pipe 4.

The process of the present invention has the following advantages.

(1) In the removal of sulfur oxides from exhaust gases by absorbing with a slurry of red mud containing calcium ion, the process of the present invention can be carried out at an improved absorption efficiency of sulfur oxides and an improved leaching yield of soda from red mud with preventing scale formation on an equipment employed.

(2) In comparison with the known processes which are carried out at a pH of not less than 6, the leaching yield of soda from red mud is improved and the amount of red mud to be used is much smaller. In other words, the process of the present invention can treat larger quantity of exhaust gases than that of the known processes using the same amount of red mud.

(3) When a slurry of red mud which has already absorbed $SO_2$ is circulated, the absorption efficiency of $SO_2$ does not lower in the process of the present invention, whereas it lowers in the known processes. Therefore, the absorption efficiency can be remarkably improved in the present invention.

(4) Since the present invention utilize red mud which has hitherto been discarded, the process of the present invention can be carried out at low cost and is also valuable from the viewpoint of prevention of pollution.

Thus, the process of the present invention is particularly suitable for the removal of sulfur oxides from exhaust gases in an industrial scale.

The present invention is further illustrated by the following Examples but is not limited thereto.

EXAMPLE 1

According to the system shown in the accompanying FIG. 1, an exhaust gas from a boiler having a temperature of 170° C. and the composition shown in Table 1 was treated by using a slurry of red mud containing calcium ion having the composition shown in Table 2 (the concentration of solid materials in the slurry was 280 g/l).

Table 1

| Composition (vol. %) | | | | |
| --- | --- | --- | --- | --- |
| $SO_2$ | $O_2$ | $CO_2$ | $H_2O$ | $N_2$ etc. |
| 0.15 | 3.3 | 12 | 11 | the rest |

$SO_2$: 1690 ppm based on the dry weight.

Table 2

| Composition (wt. %) | | | | | | |
| --- | --- | --- | --- | --- | --- | --- |
| $Na_2O$ | $Al_2O_3$ | $SiO_2$ | $Fe_2O_3$ | $TiO_2$ | CaO | Ignition Loss |
| 8.2 | 21.6 | 19.8 | 32.6 | 6.7 | 1.4 | 9.5 |

The exhaust gas was led to the cooling tower 21 through the pipe 1 at the rate of 110,000 $Nm^3$/hr. After cooled to 70° C., the gas was led to the absorption tower 22 (a non-dike perforated plate type absorption tower) through the pipe 2. In the absorption tower 22, the gas was brought into contact with the slurry of red mud of pH 5.3 fed through the pipe 11 at the rate of 300 $m^3$/hr to take up $SO_2$ in the gas. Then, the gas was led to the $SO_2$ absorption tower 23 through the pipe 3 and brought into contact with the fresh slurry of red mud of pH 7.5 fed through the pipe 8 at the rate of 300 $m^3$/hr to further take up $SO_2$ in the gas. After absorption of $SO_2$ with the slurry of red mud, the gas was released to atmosphere through the pipe 4. Each $SO_2$ content in the gas from the pipes 3 and 4 was 610 ppm and 50 ppm, respectively. The total absorption efficiency of $SO_2$ was about 97%. About 66% of total $SO_2$ was removed in the first step and the rest (about 34%) was removed in the second step.

The fresh slurry of red mud was fed to the circulating tank 24 having 40 $m^3$ of actual volume through the pipes 5 and 6. The slurry was fed to the $SO_2$ absorption tower 23 through the pipe 8 at the rate of 300 $m^3$/hr and repeatedly circulated through the tower 23, the pipe 9, the tank 24 and the pipe 8 to take up $SO_2$ in the gas. After the circulation, the slurry was led to the circulating tank 25 having 30 $m^3$ of actual volume through the pipe 10 at the rate of 21 $m^3$/hr. The slurry was again fed to the $SO_2$ absorption tower 22 through the pipe 11 at the rate of 300 $m^3$/hr and repeatedly circulated through the tower 22, the pipe 12, the tank 25 and the pipe 11 to further take up $SO_2$ in the gas. After the circulation, the slurry was continuously taken out of the system through the pipe 13.

The fresh slurry of red mud was not sent to the circulating tank 25 through the pipe 7 and the slurry in the tank 25 was not sent back to the tank 24 through the pipe 15. When a steady state was attained, pH of each slurry from the pipes 8 and 11 was 7.5 and 5.3, respectively.

The residence time of the slurry in the each circulating tank 25 and 24 was about 1.5 hours and about 2 hours, respectively, since hold-up of the slurry in the absorption towers was little and negligible.

As the result, the composition of liquid phase of the slurry fed to the $SO_2$ absorption tower 23 through the pipe 8 was 13.4 g/l of $Na_2SO_3$ and 2.1 g/l of $Na_2SO_4$ and no $NaHSO_3$ was observed. The composition of liquid phase of the slurry fed to the $SO_2$ absorption tower 22 through the pipe 11 was 18.2 g/l of $NaHSO_3$, 7.5 g/l of $Na_2SO_3$, 17.5 g/l of $Na_2SO_4$ and 0.7 g/l of $CaSO_4$ (the molar fraction of $SO_4^{--}$ to total $SO_2$ was 0.35).

In Example 1, the solid concentration of the slurry from the pipe 10 was the same as the from the pipe 8 and, also the solid concentration of the slurry from the pipe 13 was the same as that from the pipe 11 since the tanks 24 and 25 were equipped with agitators and the concentration distribution was regarded to be homogeneous. The leaching yield of soda from red mud was 16% at the pipe 10 and 62% at the pipe 13 and further 24% of soda was leached out when the slurry from the pipe 13 was oxidized.

EXAMPLE 2

The treatment of Example 1 was repeated under various conditions shown in Table 3 (pH of the slurry in the first step, molar fraction of $SO_4^{--}$ to total $SO_2$ and the concentration of $NaHSO_3$ in the second step were varied) by altering the slurry loadings and the residence time of the slurry in the circulating tanks 25 and 24.

Scale formation in the $SO_2$ absorption tower in the first step, the leaching yield of soda from red mud, the absorption efficiency of $SO_2$ in the second step and the concentration of $SO_2$ in the treated gas exhausted through the pipe 4 of each condition were tested. The results are shown in Table 3.

Table 3

| Test No. | pH in 1st step | Molar fraction in 1st step | $NaHSO_3$ in 2nd step (g/l) | Scale formation in 1st step | Soda leaching (%) | $SO_2$ absorption (%) | $SO_2$ in treated gas (ppm) |
|---|---|---|---|---|---|---|---|
| 1* | 4 | 0.48 | 18 | non** | 47 | 78 | 370 |
| 2 | 5 | 0.48 | 4 | non | 64 | 94 | 98 |
| 3 | 5.8 | 0.48 | 0 | non | 64 | 97 | 48 |
| 4* | 6.5 | 0.48 | 0 | partially built-up ($CaSO_3$) | 31 | 98 | 38 |
| 5* | 5.3 | 0.03 | 12 | partially built-up $CaSO_3$ | 54 | 89 | 200 |
| 6 | 5.3 | 0.12 | 1 | non | 58 | 95 | 85 |
| 7 | 5.3 | 0.5 | 0 | non | 62 | 96 | 65 |
| 8 | 5.3 | 0.68 | 0 | non | 63 | 96 | 68 |
| 9* | 5.3 | 0.72 | 0 | scale formation ($CaSO_4$) Operation was stopped 2 months later | 65 | 96 | 68 |
| 10* | 5.3 | 0.48 | 10 | non | 61 | 88 | 186 |

*comparative test
**After discharged the slurry, silica scale was observed in the sequent step.

What is claimed is:

1. A process for the removal of sulfur oxides from exhaust gases by absorbing with a slurry of red mud containing calcium ion which comprises the steps of:
   (1) contacting an exhaust gas containing sulfur oxides of not higher than about 100° C. with a slurry of red mud containing calcium ion led from the next step (2) to take up sulfur oxides in the gas until pH of the slurry becomes in the range of 4.3 to less than 6 while maintaining the molar fraction of $SO_4^{--}$ to total $SO_2$ in the slurry within the said pH range at 0.05 to 0.7; and then,
   (2) contacting the treated gas with a fresh slurry of red mud containing calcium ion to further take up sulfur oxides in the gas while maintaining the concentration of the $NaHSO_3$ in the slurry at not more than about 8 g/l.

2. A process according to claim 1, wherein the temperature of the exhaust gas to be contacted with the slurry in the step (1) is 40° to 80° C.

3. A process according to claim 1, wherein the pH of the slurry of red mud in the step (1) is in the range of 5 to less than 6.

4. A process according to claim 1, wherein the molar fraction of $SO_4^{--}$ to total $SO_2$ in the slurry in the step (1) is in the range of 0.12 to 0.6.

5. A process according to claim 1, wherein the feed ratio of the slurry and the exhaust gas in the step (1) is more than 0.3 l/Nm³.

6. A process according to claim 5, wherein the feed ratio is in the range of 1 to 3 l/Nm³.

7. A process according to claim 1, wherien the slurry in the step (2) has a concentration of $NaHSO_3$ of not more than about 4 g/l.

8. A process according to claim 1, wherein the pH of the slurry in the step (2) is in the range of 6 to 9.

9. A process according to claim 7, wherein the pH of the slurry is in the range of 7 to 9.

10. A process according to claim 1, wherein the feed ratio of the slurry and the gas in the step (2) is more than 0.3 l/Nm³.

11. A process according to claim 10, wherein the feed ratio is in the range of 1 to 3 l/Nm³.

12. A process according to claim 1, wherein the slurry has a concentration of solid materials of about 50 to about 500 g/l.

13. A process according to claim 12, wherein the concentration of solid materials in the slurry is in the range of about 50 to about 350 g/l.

* * * * *